(12) United States Patent
Lim et al.

(10) Patent No.: US 11,003,951 B2
(45) Date of Patent: May 11, 2021

(54) IMAGE PROCESSING APPARATUS AND IMAGE PROCESSING METHOD THEREOF

(71) Applicants: SAMSUNG ELECTRONICS CO., LTD., Suwon-si (KR); SOGANG UNIVERSITY RESEARCH & BUSINESS DEVELOPMENT FOUNDATION, Seoul (KR)

(72) Inventors: Hyungjun Lim, Suwon-si (KR); Suk-Ju Kang, Seoul (KR); Seung Joon Lee, Seoul (KR); Youngsu Moon, Suwon-si (KR); Siyeong Lee, Seoul (KR); Sung In Cho, Gyeongsan-si (KR)

(73) Assignees: SAMSUNG ELECTRONICS CO., LTD., Suwon-si (KR); Sogang University Research & Business Development Foundation, Seoul (KR)

( * ) Notice: Subject to any disclaimer, the term of this patent is extended or adjusted under 35 U.S.C. 154(b) by 91 days.

(21) Appl. No.: 16/421,021

(22) Filed: May 23, 2019

(65) Prior Publication Data

US 2020/0210766 A1  Jul. 2, 2020

(30) Foreign Application Priority Data

Dec. 26, 2018 (KR) .......................... 10-2018-0169105

(51) Int. Cl.
*G06K 9/62* (2006.01)
*G06N 3/08* (2006.01)
*G06K 9/46* (2006.01)

(52) U.S. Cl.
CPC ............. *G06K 9/6256* (2013.01); *G06K 9/46* (2013.01); *G06K 9/6262* (2013.01); *G06N 3/08* (2013.01)

(58) Field of Classification Search
CPC ...... G06K 9/6256; G06K 9/6262; G06K 9/46; G06N 3/08
See application file for complete search history.

(56) References Cited

U.S. PATENT DOCUMENTS 9,904,980 B2   2/2018  Lim et al.
2013/0227469 A1   8/2013  Park
(Continued)

FOREIGN PATENT DOCUMENTS

JP   2005-6182 A   1/2005
JP   2008-072231 A   3/2008
(Continued)

OTHER PUBLICATIONS

CVAE-GAN: Fine-Grained Image Generation through Asymmetric Training (Year: 2017).*
(Continued)

*Primary Examiner* — Nizar N Sivji
(74) *Attorney, Agent, or Firm* — Sughrue Mion, PLLC

(57) ABSTRACT

An image processing apparatus is provided. The image processing apparatus includes a memory configured to store at least one instruction; and a processor configured to read the at least one instruction and configured to, according to the at least one instruction: apply a learning network model to an input image frame and acquire information on an area of interest; and acquire an output image frame by retargeting the input image frame based on the acquired information on the area of interest. The learning network model is a model that is trained to acquire the information on the area of interest in the input image frame.

15 Claims, 14 Drawing Sheets

(56) References Cited

U.S. PATENT DOCUMENTS

| | | |
|---|---|---|
| 2014/0157192 A1 | 6/2014 | Toda |
| 2015/0063705 A1* | 3/2015 | Shankaramurthy ... G06T 3/0012 |
| | | 382/195 |
| 2016/0078614 A1 | 3/2016 | Ryu et al. |
| 2017/0046613 A1* | 2/2017 | Paluri .................. G06N 3/0454 |
| 2018/0247405 A1 | 8/2018 | Kisilev et al. |
| 2019/0114818 A1* | 4/2019 | Lin .......................... G06T 5/005 |
| 2019/0266784 A1* | 8/2019 | Singh .................... G06F 9/3877 |
| 2019/0295305 A1* | 9/2019 | Yang ...................... G06N 3/088 |

FOREIGN PATENT DOCUMENTS

| | | |
|---|---|---|
| KR | 10-1397685 B1 | 5/2014 |
| KR | 10-1544156 B1 | 8/2015 |
| KR | 10-2016-0028286 A | 3/2016 |

OTHER PUBLICATIONS

Neural Kinematic Networks for Unsupervised Motion Retargetting (Year: 2018).*

International Search Report (PCT/ISA/210) dated Feb. 26, 2020 issued by the International Searching Authority in International Application No. PCT/KR2019/014121.

Written Opinion (PCT/ISA/237) dated Feb. 26, 2020 issued by the International Searching Authority in International Application No. PCT/KR2019/014121.

Joseph Redmon et al. "YOLOv3: An Incremental Improvement" arXiv preprint arXiv:1804.02767, Apr. 8, 2018 (pp. 1-6).

Pierre Greisen et al. "Algorithm and VLSI Architecture for Real-Time 1080p60 Video Retargeting" High Performance Graphics, Jun. 25, 2012 (10 pages total).

* cited by examiner

IMAGE PROCESSING APPARATUS AND IMAGE PROCESSING METHOD THEREOF

CROSS-REFERENCE TO RELATED APPLICATION(S)

This application is based on and claims priority under 35 U.S.C. § 119(a) of a Korean Patent Application No. 10-2018-0169105, filed on Dec. 26, 2018, in the Korean Intellectual Property Office, the disclosure of which is incorporated by reference herein in its entirety.

BACKGROUND

1. Field

The disclosure relates to an image processing apparatus and an image processing method thereof, and more particularly, to an image processing apparatus that performs retargeting processing on an input image and acquires an output image, and an image processing method thereof.

2. Description of Related Art

According to the development of electronic technologies, various types of electronic apparatuses are being developed and distributed. In particular, display apparatuses used in various places such as households, offices and public places have been continuously developed.

Recently, there are increasing demands for a high resolution image providing service and a real time streaming service. When the resolution of an input image and the output resolution are different from each other, image processing may be performed to control the resolution of the input image to be identical to the output resolution. When the aspect ratio (or the width to length ratio) of the resolution of an input image is identical to that of the output resolution, there is no image distortion caused by the image processing. However, when the aspect ratios are different between the input resolution and the output resolution, image distortion may occur.

SUMMARY

Provided are an image processing apparatus that is capable of acquiring an output image while minimizing image distortion through detection of an area of interest and adjusting an aspect ratio of an input image, and an image processing method thereof.

In accordance with an aspect of the disclosure, there is provided an image processing apparatus, including: a memory storing at least one instruction; and a processor configured to read the at least one instruction and configured to, according to the at least one instruction: apply a learning network model to an input image frame and acquire information on an area of interest; and acquire an output image frame by retargeting the input image frame based on the acquired information on the area of interest, wherein the learning network model is a model that is trained to acquire the information on the area of interest in the input image frame.

The information on the area of interest may include at least one of size information, location information or type information of the area of interest.

The information on the area of interest may be one dimensional information, the one dimensional information including location information in a parallel direction and size information of the input image frame corresponding to the area of interest.

The processor may be further configured to: identify at least one piece of one dimensional information among a plurality of pieces of one dimensional information based on at least one of a size of the one dimensional information or types of objects corresponding to the one dimensional information, and retarget the input image frame based on the identified one dimensional information.

The processor may be further configured to: retarget the input image frame by applying a first conversion weight to pixels corresponding to the area of interest of the input image frame, and by applying a second conversion weight to pixels corresponding to a remaining area of the input image frame other than the area of interest, and the second conversion weight is acquired based on resolution information on the input image frame and resolution information on the output image frame.

The processor may be further configured to: maintain a size of the pixels corresponding to the area of interest by applying the first conversion weight to the pixels, and upscale the pixels corresponding to the remaining area by applying the second conversion weight to the pixels.

The processor may be further configured to: accumulate information on the area of interest acquired from each of a first input image frame and at least one second input image frame that was input prior to the first input image frame, and acquire information on the area of interest corresponding to the first input image frame based on the accumulated information.

The processor may be further configured to: acquire average size information and average location information of the area of interest based on size information and location information of the area of interest acquired from each of the first input image frame and the at least one second input image frame, and acquire an output image frame corresponding to the first input image frame based on the average size information and the average location information of the area of interest.

The learning network model may include a feature detector configured to detect information related to objects included in the input image frame, and a feature map extractor configured to acquire size information, location information and type information of the area of interest.

The learning network model may be configured to learn a weight of a neural network included in the learning network model by using the information on the area of interest and a plurality of images corresponding to the information on the area of interest.

The image processing apparatus may further include a display, and the processor may be further configured to: control the display to display the acquired output image frame.

In accordance with an aspect of the disclosure, there is provided an image processing method by an image processing apparatus, the image processing method including: applying learning network model to an input image frame and acquiring information on an area of interest; and acquiring an output image frame by retargeting the input image frame based on the information on the area of interest, wherein the learning network model is a model that is trained to acquire the information on the area of interest in the input image frame.

The information on the area of interest may include at least one of size information, location information or type information of the area of interest.

The information on the area of interest may include one dimensional information, the one dimensional information including location information in a parallel direction and size information of the input image frame corresponding to the area of interest.

The acquiring the output image frame may include: identifying at least one piece of one dimensional information among a plurality of pieces of one dimensional information based on at least one of a size of the one dimensional information or types of objects corresponding to the one dimensional information, and retargeting the input image frame based on the identified one dimensional information.

The acquiring the output image frame may include: retargeting the input image frame by applying a first conversion weight to pixels corresponding to the area of interest of the input image frame, and applying a second conversion weight to pixels corresponding to a remaining area of the input image frame other than the area of interest, and the second conversion weight is acquired based on resolution information on the input image frame and resolution information on the output image frame.

The acquiring the output image frame may include: maintaining a size of the pixels corresponding to the area of interest by applying the first conversion weight to the pixels, and upscaling the pixels corresponding to the remaining area by applying the second conversion weight to the pixels.

The acquiring the information on the area of interest may include: accumulating information on the area of interest acquired from each of a first input image frame and at least one second input image frame that was input prior to the first input image frame, and acquiring information on the area of interest corresponding to the first input image frame based on the accumulated information.

The acquiring the information on the area of interest may include: acquiring average size information and average location information of the area of interest based on size information and location information of the area of interest acquired from each of the first input image frame and the at least one second input image frame, and the acquiring the output image frame may include: acquiring the output image frame corresponding to the first input image frame based on the average size information and the average location information of the area of interest.

In accordance with an aspect of the disclosure, there is provided a non-transitory computer readable medium storing a computer instruction which, when executed by a processor of an image processing apparatus, causes the processor to perform: applying a learning network model to an input image frame and acquiring information on an area of interest; and retargeting the input image frame based on the information on the area of interest and acquiring an output image frame, wherein the learning network model is a model that is trained to acquire the information on the area of interest in the input image frame.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
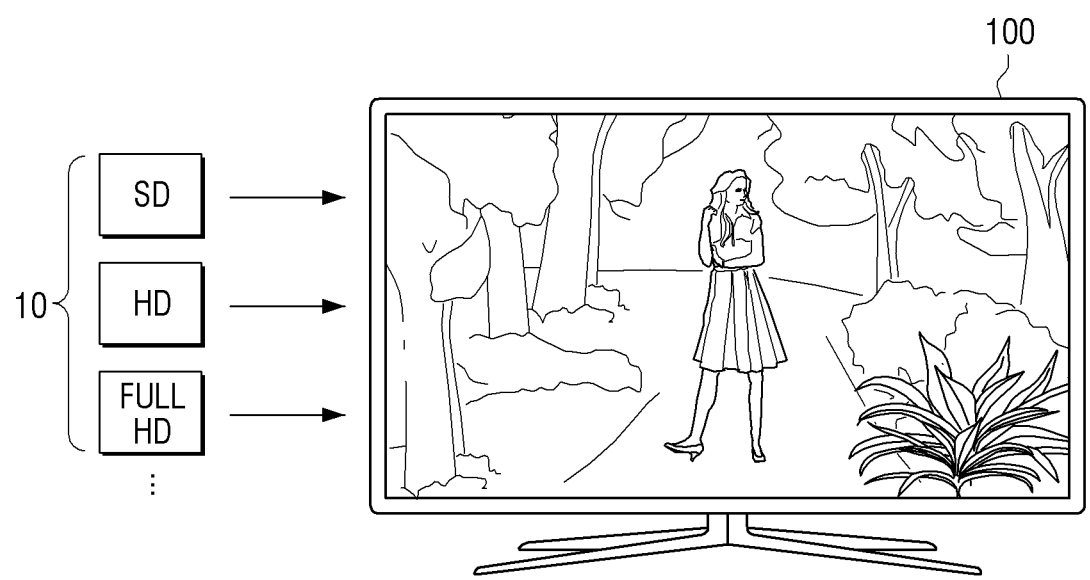
FIG. 1 is a diagram for illustrating an example of implementation of an image processing apparatus according to an embodiment.

Hereinafter, the disclosure will be described in detail with reference to the accompanying drawings.

First, the terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions or emergence of new technologies, and the like. Also, in particular cases, there may be terms that were designated by the applicant on his own, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Further, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. In case it is determined that in describing embodiments, detailed explanation of related known technologies may unnecessarily confuse the gist of the disclosure, the detailed explanation will be omitted.

In addition, the expressions "first," "second" and the like used in the disclosure may be used to describe various elements, but the expressions are not intended to limit the elements. Such expressions are used only to distinguish one element from another element.

Singular expressions may be interpreted to include plural expressions, unless defined differently in the context. In this specification, terms such as "include" and "consist of" should be construed as designating that there are such characteristics, numbers, steps, operations, elements, components or a combination thereof in the specification, but not as excluding in advance the existence or possibility of adding one or more of other characteristics, numbers, steps, operations, elements, components or a combination thereof.

The expression "at least one of A and/or B" should be interpreted to mean any one of "A" or "B" or "A and B."

Also, the terms "a module" or "a part" used in the disclosure are for referring to elements performing at least one function or operation, and these elements may be implemented as hardware or software, or as a combination of hardware and software. Further, a plurality of "modules" or "parts" may be integrated into at least one module and implemented as at least one processor, except "modules" or "parts" that need to be implemented as specific hardware.

Hereinafter, embodiments will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1 is a diagram for illustrating an example of implementation of an image processing apparatus according to an embodiment.

An image processing apparatus 100 may be implemented as a TV or a set-top box as illustrated in FIG. 1. However, the image processing apparatus 100 is not limited thereto, and any apparatus which is equipped with the function of processing and/or displaying images can be applied without limitation, such as a smartphone, a tablet personal computer (PC), a laptop PC, a head mounted display (HMD), a near eye display (NED), a large format display (LFD), digital signage, a digital information display (DID), a video wall, a projector display and a camera.

The image processing apparatus 100 may receive various types of compressed images or images having various resolutions. For example, the image processing apparatus 100 may receive images in compressed forms, such as a moving picture experts group (MPEG) (e.g., MP2, MP4, MP7, etc.), a joint photographic coding experts group (JPEG), advanced video coding (AVC), H.264, H.265, a high efficiency video codec (HEVC), etc. Alternatively, the image processing apparatus 100 may receive any one image from standard definition (SD), high definition (HD), full HD and ultra HD images.

When the aspect ratio of the resolution of an image input according to an embodiment is different from that of the output resolution, retargeting processing for making the resolution of the input image identical to the output resolution is required. For example, when the resolution of an input image is an HD or full HD image, and the output resolution is an ultra HD image, retargeting processing is performed on the image in accordance with the output resolution. In this case, there is a problem that, as the aspect ratio (or the width to length ratio) of the input image is adjusted to be identical to the aspect ratio of the output image, image distortion may occur. Various embodiments minimize or prevent image distortion when the aspect ratio of the resolution of an input image is adjusted to that of the output resolution.

Figure 2:
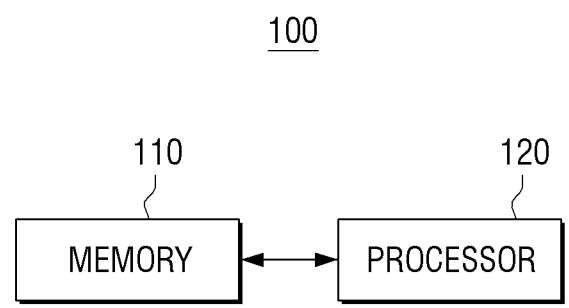
FIG. 2 is a block diagram which illustrates a configuration of an image processing apparatus according to an embodiment.

FIG. 2 is a block diagram which illustrates a configuration of an image processing apparatus according to an embodiment.

According to FIG. 2, the image processing apparatus 100 includes memory 110 and a processor 120.

The memory 110 may be electrically connected to the processor 120, and may store data according to various embodiments. For example, the memory 110 may be implemented as internal memory such as ROM (e.g., electrically erasable programmable read-only memory (EEPROM)), RAM, etc. included in the processor 120, or memory separate from the processor 120. In this case, the memory 110 may be implemented in the form of memory embedded in the image processing apparatus 100, or in the form of memory that can be attached to or detached from the image processing apparatus 100, according to the usage of stored data. For example, in the case of data for operating the image processing apparatus 100, the data may be stored in memory embedded in the image processing apparatus 100, and in the case of data for the extending function of the image processing apparatus 100, the data may be stored in memory that can be attached to or detached from the image processing apparatus 100. In the case of memory embedded in the image processing apparatus 100, the memory may be implemented as at least one of volatile memory (e.g., dynamic RAM (DRAM), static RAM (SRAM) or synchronous dynamic RAM (SDRAM), etc.) or non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), a hard drive or a solid state drive (SSD)). In the case of memory that can be attached to or detached from the image processing apparatus 100, the memory may be implemented in a form such as a memory card (e.g., compact flash (CF), secure digital (SD), micro secure digital (Micro-SD), mini secure digital (Mini-SD), extreme digital (xD), a multi-media card (MMC), etc.) and external memory that can be connected to a USB port (e.g., USB memory), etc.

The memory 110 stores an instruction that controls the processor 120 to acquire an output image frame based on information on an area of interest acquired by applying an input image frame to a learning network model. Here, the learning network model may be a model that is trained to acquire information on an area of interest in an input image frame. According to an embodiment, the memory 110 may store a learning network model according to an embodiment. However, according to another embodiment, a learning network model may be stored in at least one of an external server or an external apparatus.

The processor 120 is electrically connected to the memory 110, and controls the overall operations of the image processing apparatus 100.

According to an embodiment, the processor 120 may be implemented as a digital signal processor (DSP) processing digital image signals, a microprocessor, and a time controller (TCON). However, the processor 120 is not limited thereto, and it may include one or more of a central processing unit (CPU), a micro controller unit (MCU), a micro processing unit (MPU), a controller, an application processor (AP) or a communication processor (CP), and an ARM processor, or may be defined by the terms. Also, the processor 120 may be implemented as a system on chip (SoC) having a processing algorithm stored therein or large scale integration (LSI), or in the form of a field programmable gate array (FPGA).

The processor 120 may provide an input image frame to a learning network model by executing an instruction stored in the memory 110, and acquire an output image frame based on information on an area of interest output from the learning network model.

According to an embodiment, the processor 120 retargets an input image frame, i.e., adjusts the aspect ratio of an input image frame, based on information on an area of interest output from a learning network model, and acquires an output image frame. Here, information on an area of interest may include at least one of size information, location information or type information of the area of interest. For example, information on an area of interest may include one dimensional information including location information identified in a parallel direction (or a vertical direction) and size information of an input image frame. For example, in the case of upscaling an input image frame in a parallel direction, information on an area of interest may be one dimensional information including location information identified in a parallel direction and size information. In the case of upscaling an input image frame in a vertical direction, information on an area of interest may be one dimensional information including location information identified in a vertical direction and size information. Hereinafter, for illustrative purposes, descriptions will be made based on the assumption that information on an area of interest is one dimensional information including location information identified in a parallel direction and size information of an input image frame. However, the disclosure is not limited thereto and it is possible that the information includes both of location information identified in vertical and parallel directions and size information.

A learning network model may learn the weight of a neural network included in the learning network model by using information on an area of interest and a plurality of images corresponding to the information on an area of interest. Here, the plurality of images may include various types of images such as separate still images, a plurality of continuous images constituting a moving image, etc.

According to an embodiment, a learning network model may include a feature detector that detects information related to objects included in an input image frame and a feature map extractor that acquires size information, location information and type information of an area of interest. For example, a feature detector may detect information related to objects including at least one of information on some objects or information on the entire objects based on a combination of feature information including edge information, corner information, color information, etc. A feature map extractor may extract size information and location information of an area of interest according to an embodiment as one dimensional information, and acquire the type information of objects included in the area of interest. Here, the one dimensional information may include location information identified in a parallel direction and size information of an image frame. Also, the type information may be information on one of classes (or types) in a predefined number (e.g., 20).

Figure 3:
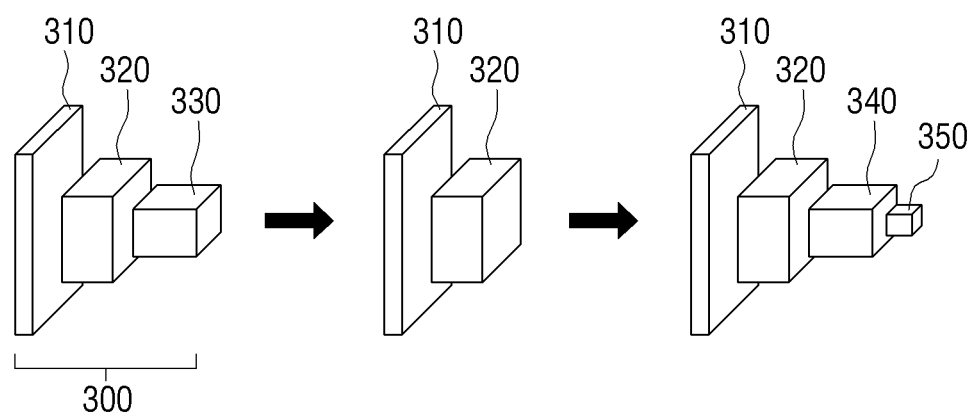
FIG. 3 is a diagram for illustrating a learning network model according to an embodiment.
Figure 4:
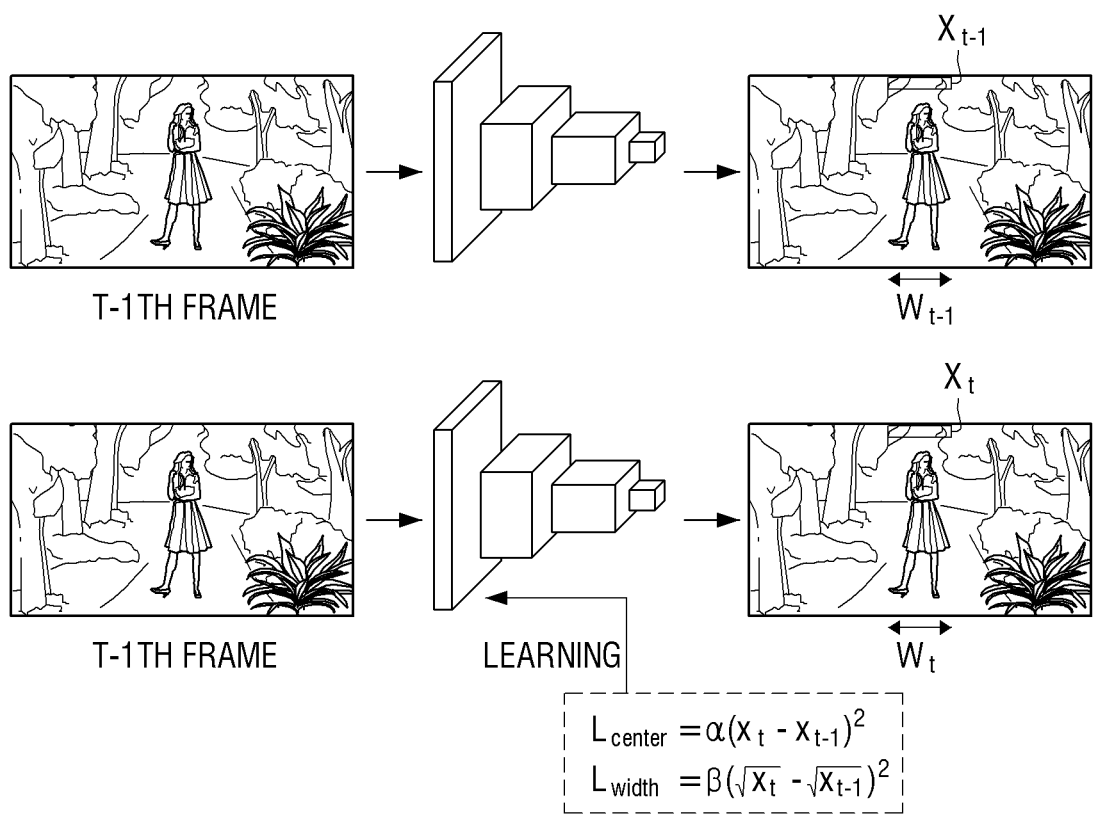
FIG. 4 is a diagram for illustrating a learning network model according to an embodiment.
Figure 5:
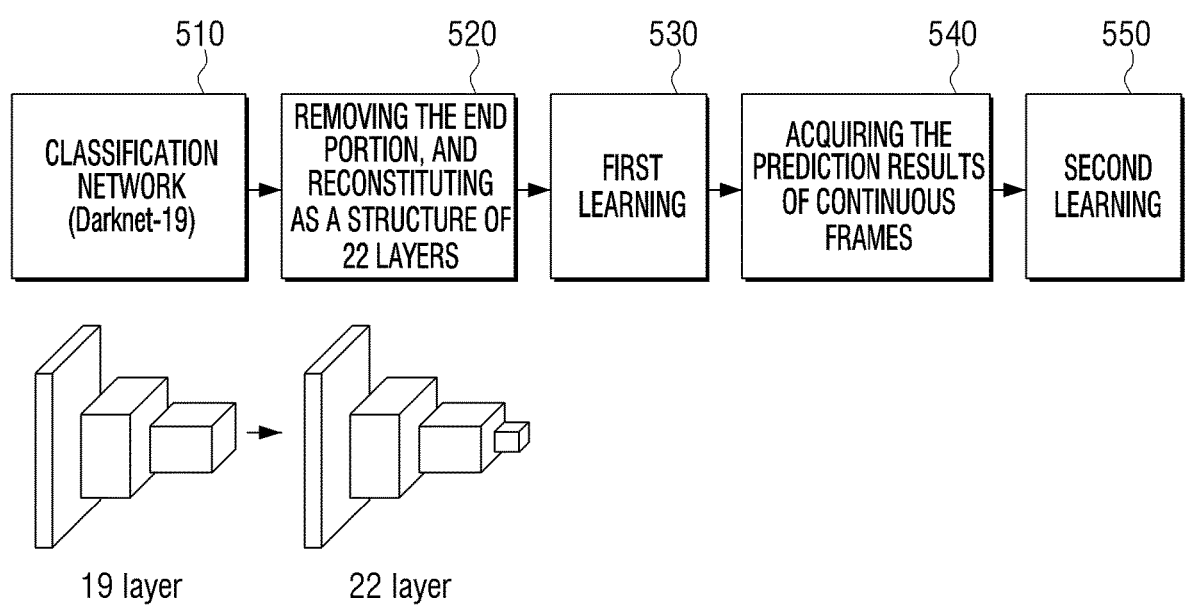
FIG. 5 is a diagram for illustrating a learning network model according to an embodiment.

FIGS. 3, 4, and 5 are diagrams for illustrating a learning network model according to embodiments.

A learning network model according to an embodiment may be a model that was acquired by designing such that desired output data can be obtained for an input image through continuous convolutional operations, and learning the design. In particular, a learning network model may be a model that predicts locations, sizes and names of specific objects that are meaningful for an input image.

A learning network model (or a classification network model) according to an embodiment may be acquired by fine-tuning a conventional learning model (e.g., Darknet-19 (a VGG-19 network based on C language)) such that detection of objects is possible. For example, a learning network model may be a model that re-learned a conventional object detection system based on a deep artificial neural network which was modified according to an embodiment.

For example, according to FIG. 3, a learning network model according to an embodiment may be a learning network model including 22 layers in total which was acquired by removing portions 330 after the 15th layer among a plurality of layers 310, 320, 330 included in Darknet-19 300, and then adding 7 layers 340, 350. Here, the basic layers 310, 320 may belong to the aforementioned feature detector, and the additional layers 340, 350 may belong to the feature map extractor, but the layers are not limited thereto. For example, after the basic layers 310, 320 are trained first, the additional layers may be combined, and trained additionally.

According to an embodiment, information on an area of interest in units of each row of an image frame may be acquired through a learning network model, in order to readjust the size of an input image frame in a parallel direction. Accordingly, the output data of a learning network model may be X (location information in a parallel direction), W (size information), and the name. In this case, Y (location information in a vertical direction) is not necessary. Thus, even if the number of the convolutional layers of an artificial neural network is smaller than 81 of Darknet-19 (REDMON, Joseph; FARHADI, Ali. Yolov3: An incremental improvement. arXiv preprint arXiv:1804.02767, 2018.), precise prediction data can be acquired. That is, in the disclosure, the number of parameters necessary for prediction of detection of objects can be drastically reduced by using 22 convolutional layers, as illustrated in FIG. 3, and at the same time, a performance similar to that of a conventional technology can be maintained.

To be specific, as illustrated in FIG. 5, a classification network, e.g., Darknet-19, 510 may be reconstituted 520 as a network including 22 layers in total, by removing layers 330 in the end portion after the 15th layer included in the Darknet-19 510, and adding 7 layers 340, 350, and the network may learn detection of objects based on a sample data set (first learning) 530, and then the prediction values of continuous frames may be acquired 540, and the network may be additionally trained for the acquired prediction values (second learning) 550. The basic layers 310, 320 may learn detection of objects in advance before the 7 layers 340, 350 are combined, as described above, but the disclosure is not limited thereto.

Here, the sample data set may include one dimensional information on various types of images and objects in the images (box information that will be described later) and name information in a predetermined number (e.g., 20). That is, an artificial neural network may be trained with respect to X (location information in a parallel direction), W (size information), and names based on a sample data set.

In additional training, an artificial neural network may be trained while regarding the prediction value of a previous image frame as a truth value of the next image frame. In this case, training may be performed in a direction of minimizing temporal loss, by defining a temporal loss function such that an artificial neural network can perform uniform size and location prediction for image frames that are continuously input. The following Equation 1 represents a temporal loss function defined according to an embodiment.

$$L_{width} = \beta(\sqrt{w_t} - \sqrt{w_{t-1}})^2 \quad \text{[Equation 1]}$$

$$L_{center} = \alpha(x_t - x_{t-1})^2 \quad \text{[Equation 2]}$$

By using temporal loss functions as in Equations 1 and 2, an artificial neural network may be additionally trained in a direction that the values of W and X of predicted objects are maintained to be similar for continuous frames of a moving image. In such additional training, continuous image frames are needed. Accordingly, additional training may be performed with respect to temporal loss functions with image frames of several moving images.

To be specific, xt−1 and wt−1 which are the prediction results of previous image frames in Equations 1 and 2 become truth values compared with xt and wt which are the prediction result of the current image frames, and an artificial neural network may be trained such that the differences between these values are minimized. That is, an artificial neural network may be trained such that it can be expected that prediction results become similar in continuous image frames. In this case, all of the 22 layers may be involved in training without removing the end portion of the network. For example, an artificial neural network may be trained with Learning rate=0.01, Weight decay=0.0005, and momentum=0.9, but the disclosure is not limited thereto.

Returning to FIG. 2, according to another embodiment, the processor 120 may identify at least one piece of one dimensional information among a plurality of pieces of one dimensional information based on at least one of the size of the one dimensional information or the types of objects corresponding to the one dimensional information, and identify an area of interest in an input image frame based on the identified one dimensional information. Here, the one dimensional information may include location information X identified in a parallel direction and size information Y of the input image frame, as described earlier.

As an example, the processor 120 may identify only one dimensional information corresponding to a predetermined size or greater as an area of interest. As another example, the processor 120 may identify only one dimensional information of a predetermined type (e.g., humans, animals) as an area of interest. As still another example, the processor 120 may identify one dimensional information as an area of interest only when the information is one dimensional information above a predetermined size and falls under a predetermined type (e.g., humans, animals).

Figure 6:
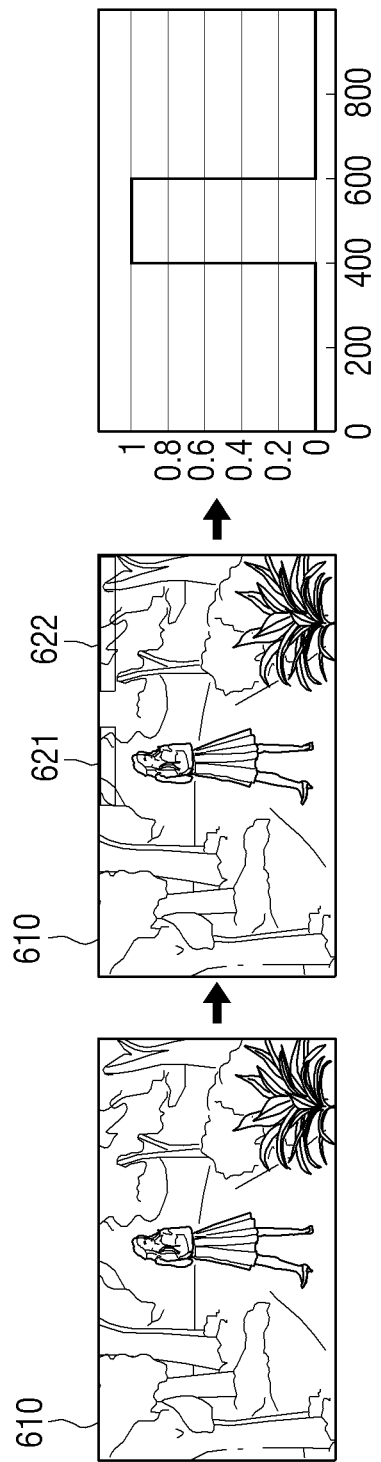
FIG. 6 is a diagram which illustrates an example of information on an area of interest according to an embodiment.

FIG. 6 is a diagram for illustrating a method for acquiring an area of interest according to an embodiment.

According to an embodiment, a learning network model may predict the center coordinate X, the size in width W, and name information of an object, and output information on an area of interest as one dimensional information. For example, information in the form of a one dimensional box (or bounding box information) may be output in an area corresponding to an area of interest, as illustrated in FIG. 6. In this case, the one dimensional box information may be set as a value of 1, and the remaining area may be set as a value of 0. That is, one dimensional box information may specify the information on the width area, i.e., location and size information, and in this case, a corresponding length area may be projected based on the one dimensional box information, and a one dimensional area of interest may thereby be obtained. For example, a one dimensional area of interest may be implemented as a one dimensional matrix which indicates whether each row of an image is an area of interest or not with a value of 1 or 0.

However, when all of one dimensional box information of a predicted image is projected on an area of interest through a learning network model, an unnecessary area of interest may be acquired. For example, when there are an excess number of people in an image, regarding all the people in the image as an area of interest may be an unnecessary work. Also, in the case of using a learning network model that re-learned names (or types) in an excessive number, all predictable objects such as cars and people are output as a one dimensional box, which may be an unnecessary work. Accordingly, implementation may be made in such a way that only a one dimensional box including objects in predetermined specific names (or types) is projected on a one dimensional area of interest based on the characteristic of an image. For example, as illustrated in FIG. 6, when a plurality of one dimensional boxes 621, 622 are acquired from an input image frame 610, only a specific one dimensional box 621 may be selected based on the sizes of the one dimensional boxes or the names (or types) of objects corresponding to the one dimensional boxes. In this case, only the selected one dimensional box 621 may be projected on a one dimensional area of interest. That is, only the area corresponding to the selected one dimensional box 621 may be identified as an area of interest.

In the aforementioned embodiment, it was described that a learning network model outputs all of identified one dimensional boxes, and the processor 120 identifies a specific one dimensional box based on the sizes of the one dimensional boxes or the names (or types) of objects corresponding to the one dimensional boxes. However, identification of a specific one dimensional box can be performed in a learning network model according to embodiments of implementation. That is, a learning network model may be trained such that, when one dimensional boxes above a threshold number are identified, a specific one dimensional box is identified based on the sizes of the one dimensional boxes or the names (or types) of objects corresponding to the one dimensional boxes, and only the information on the identified one dimensional box is output.

A learning network model may not detect objects in a specific frame, and the size of one dimensional information predicted for the same object included in the same scene may be different per frame. This means that the areas of interest of continuous frames may not be uniform, and in this case, there is a risk that the retargeted image may shake. Accordingly, there may be a need to consider temporal coherency in information on areas of interest.

Thus, according to another embodiment, the processor 120 may accumulate information on an area of interest acquired from each of a first input image frame and at least one second input image frame that was input prior to the first input image frame, and acquire information on an area of interest corresponding to the first input image frame based on the accumulated information. Here, the first input image frame and at least one second input image frame may be frames belonging to the same scene, but the frames are not limited thereto. In the case of training a learning network model with respect to an operation through a learning network, corresponding information can be acquired through the learning network.

To be specific, the processor 120 may acquire average size information and average location information of an area of interest corresponding to the first input image frame based on the size information and the location information of the area of interest acquired from each of the first input image frame and the second input image frame. In this case, the processor 120 may acquire an output image frame corresponding to the first input image frame based on the average size information and the average location information of the area of interest. In the case of training a learning network model with respect to an operation through a learning network, corresponding information can be acquired through the learning network. For example, the processor 120 may apply a moving average filter for one dimensional information of each image frame included in the same scene.

Figure 7:
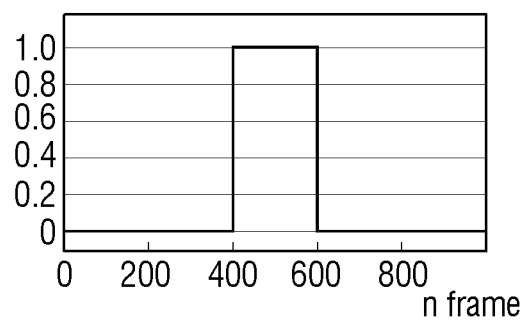
FIG. 7 is a diagram which illustrates an example of information on an area of interest according to another embodiment.
Figure 7:
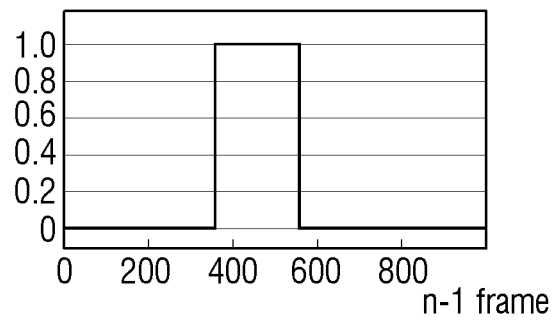
Figure 7:
Figure 7:
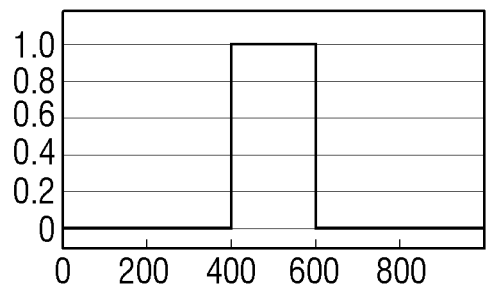
Figure 7:
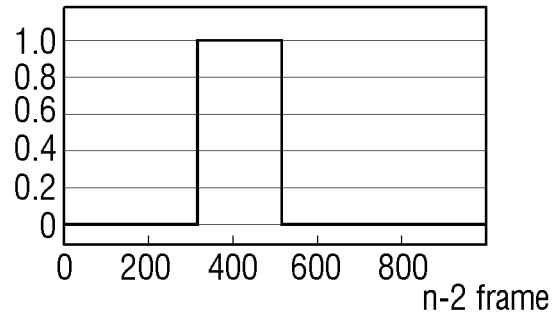

For example, as illustrated in FIG. 7, the processor 120 may accumulate information on the areas of interest of previous image frames (e.g., n–2$^{th}$ and n–1$^{th}$ frames) and the current image frame (e.g., the n$^{th}$ frame), and acquire information on the area of interest corresponding to the current image frame. Here, previous image frames may be image frames constituting the same scene as that of the current image frame. To be specific, as illustrated in FIG. 7, the processor 120 may acquire average size information and average location information regarding the size information and the location information of the area of interest acquired from each of the previous image frames and the current image frame, and determine the average size information and the average location information as the size information and the location information of the area of interest corresponding to the current image frame. As described above, by using an area of interest to which a moving average has been applied, temporal distortion according to loss or movement of the area of interest can be reduced.

Returning to FIG. 2, when an area of interest and the remaining area (or an area of non-interest) are identified, the processor 120 may determine a conversion weight for each row (or each column) of an input image frame included in each area, i.e., the ratio of size conversion. The processor 120 may assign the ratio of size conversion in a parallel direction for rows included in an area of interest as 1, and for the rows included in the remaining area, calculate a conversion ratio that satisfies the target aspect ratio. For example, regarding the rows included in the remaining area, the processor 120 may calculate a conversion ratio by increasing the conversion ratio until the ratio satisfies the target aspect ratio.

For the convenience of explanation, the width of an input image frame in a parallel direction will be assumed as W (a pixel unit), and the target width in a parallel direction will be assumed as W' (a pixel unit). In addition, assuming that the number of rows belonging to the one dimensional area of interest as X, the size conversion ratio γ of the remaining area excluding the area of interest may be calculated as in the following Equation 3.

$$\gamma = \frac{W' - X}{W - X} \quad \text{[Equation 3]}$$

Accordingly, the processor 120 may adjust the size of an image by determining the first weight as 1, and determining the second weight as γ.

According to an embodiment, when information on an area of interest is acquired from a learning network model, the processor 120 may retarget an input image frame by applying the first conversion weight to pixels corresponding to the area of interest, and applying the second conversion weight to pixels corresponding to the remaining area (or an area of non-interest). Here, the second conversion weight may be acquired based on retargeting information. Also, the retargeting information may include resolution information of the input image frame and resolution information of the output image frame. Alternatively, the retargeting information may include the aspect ratio of the input image frame and the aspect ratio of the output image frame. Still alternatively, the retargeting information may include information on adjustment of the aspect ratio of the input image frame that was calculated based on the resolution information of the input image frame and the resolution information of the output image frame. For example, for pixels corresponding to an area of interest, the processor 120 may maintain the size of the corresponding area by applying the first conversion weight to the pixels, and for pixels corresponding to the remaining area, the processor 120 may upscale the size of the corresponding area by applying the second conversion weight to the pixels.

To be specific, when the ratio of size conversion in a parallel direction for the area of non-interest is calculated from information on the area of interest (or information on the area of interest to which a moving average has been applied), the processor 120 may identify the locations of rows wherein data of each row of the input image frame is newly arranged in the retargeted image frame. For example, by performing a convolutional operation of the input image frame and a matrix of the size conversion ratio in a parallel direction, image data of rows may be rearranged. In this process, row data of an empty space may be generated, and by filling the row data of an empty space in a similar manner to the image data of an adjacent row by performing image interpolation, a retargeted image frame may be obtained. In this case, by reproducing a retargeted image frame corresponding to each image frame, a retargeted moving image may be obtained.

Figure 8A:
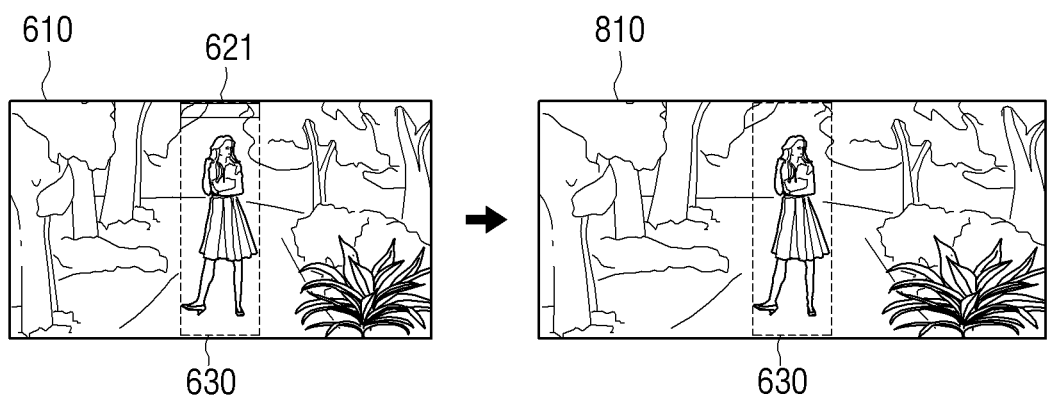
FIG. 8A is a diagram for illustrating a method for adjusting the size of an image according to an embodiment.
Figure 8B:
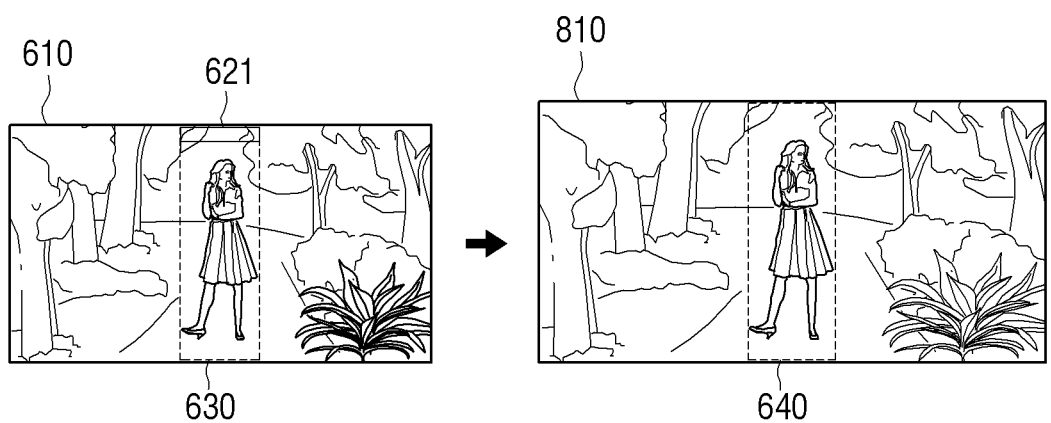
FIG. 8B is a diagram for illustrating a method for adjusting the size of an image according to another embodiment.

FIGS. 8A and 8B are diagrams for illustrating a retargeting method according to an embodiment.

As described in FIG. 6, when an area of interest 630 is identified based on one dimensional box information 621 in an input image frame, an area of interest and the remaining area may be divided, and the size conversion ratio of each area may be determined. For example, the processor 120 may assign the ratio of size conversion in a parallel direction for rows included in an area of interest as 1, and for the rows included in the remaining area (an area of non-interest), calculate a conversion ratio that satisfies the target aspect ratio. For example, regarding the rows included in the remaining area (an area of non-interest), the processor 120 may calculate a conversion ratio that satisfies the target aspect ratio for implementing the resolution of the output image frame.

In this case, as illustrated in FIG. 8A, an output image frame 810 may be obtained, in which the size of the area of interest 630 is maintained, and the size of the remaining area is upscaled.

Here, upscaling may be in the form of adding pixel values. For example, in a case where the conversion ratio in a parallel direction of rows included in the remaining area (an area of non-interest) is 0, rows having the same pixel values as the values of pixels included in each row may be added as adjacent rows of each row, and their sizes in a parallel direction may be enlarged by two times. However, this is just an example, and various image processing methods by which the sizes of previous areas can be enlarged can be applied to the disclosure.

In FIG. 8A, a case wherein there is no need to adjust the size in length (or the size in width) of an input image frame was described. Also, in order to meet the resolution of an output image frame, the size in length (or the size in width)

of an input image frame may have to be adjusted, as well as the size in width (or the size in length).

In this case, as illustrated in FIG. 8B, the processor 120 may determine the conversion ratios in vertical/parallel directions of an area of interest based on the sizes in length of an input image frame and an output image frame. That is, the processor 120 may determine the conversion ratio in a vertical direction of an input image frame that makes the size in length identical to the size in length of an output image, and scale an area of interest 630 in vertical and parallel directions based on a conversion ratio in a parallel direction that is identical to the conversion ratio in a vertical direction. For example, in a case where the size in length of an input image frame 610 is 480 pixels, and the size in length of an output image frame 810 is 960 pixels, the processor 120 may determine the conversion ratios in vertical/parallel directions of an area of interest as 4.5 (2160/480), and determine the conversion ratios in vertical/parallel directions of the other area based on the sizes in width of the input image frame and the output image frame.

Figure 9:
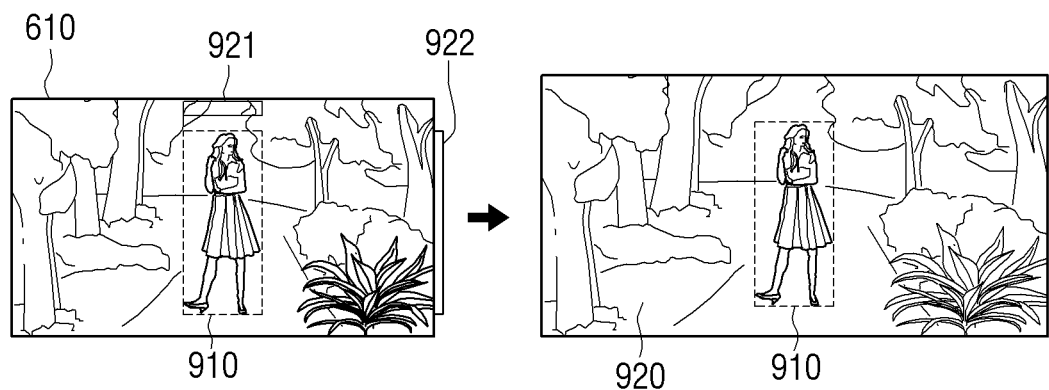
FIG. 9 is a diagram for illustrating a method for adjusting the size of an image according to still another embodiment.

FIG. 9 is a diagram for illustrating a retargeting method according to another embodiment.

According to another embodiment, information on an area of interest may be two dimensional information including not only information in a width direction 921, but also information in a length direction 922. In this case, the processor 120 may specify an area of interest 910 in an input image frame 610 based on two dimensional information, and for pixels included in the area of interest, the processor 120 may assign the conversion ratios in parallel/vertical directions as 1, and for pixels included in the remaining area (an area of non-interest), the processor 120 may calculate a conversion ratio that satisfies the target aspect ratio. For example, for pixels included in the remaining area (an area of non-interest), the processor 120 may calculate a conversion ratio that satisfies the target aspect ratio for implementing the resolution of the output image frame. In this case, the processor 120 may respectively calculate a conversion ratio in a parallel direction and a conversion ratio in a vertical direction based on the resolution of the input image frame and the resolution of the output image frame. Then, the processor 120 may acquire an output image frame 920 by applying the calculated conversion ratio in a parallel direction and conversion ratio in a vertical direction for the pixels included in the remaining area.

Figure 10:
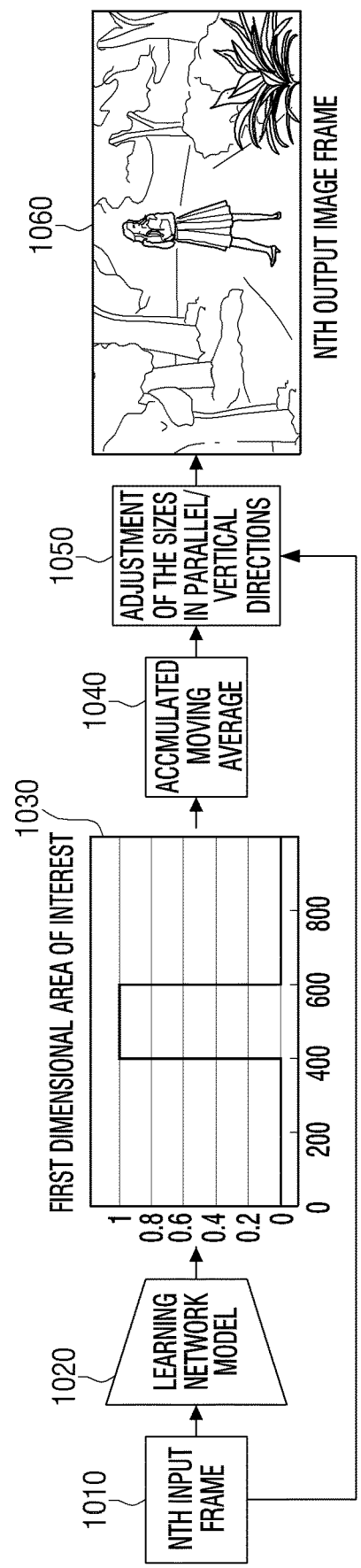
FIG. 10 is a diagram which illustrates an example of information on an area of interest according to another embodiment.

FIG. 10 is a diagram for illustrating an image processing method according to an embodiment.

According to the image processing method illustrated in FIG. 10, the processor 120 may provide an $n^{th}$ input image frame 1010 to a learning network model 1020, and acquire one dimensional information on an area of interest 1030. In this case, the processor 120 may calculate accumulated moving average information of the acquired one dimensional information on an area of interest and one dimensional information on an area of interest acquired from the previous frame 1040. Then, the processor 120 may adjust the size of the input image frame in parallel/vertical directions based on the accumulated moving average information that was calculated 1050, and acquire an output image frame 1060 corresponding to the $n^{th}$ input image frame 1010.

Figure 11:
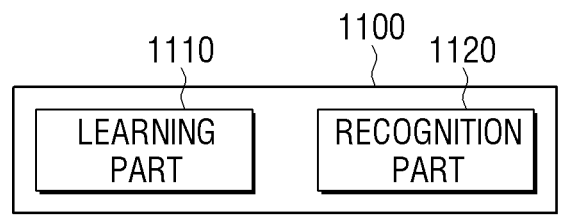
FIG. 11 is a diagram which illustrates an example of implementation of an image processing apparatus according to another embodiment.

FIG. 11 is a diagram for illustrating a detailed configuration of a learning network model according to an embodiment.

According to FIG. 11, a learning network model 1100 according to an embodiment may include a learning part 1110 and a recognition part 1120.

The learning part 1110 may generate or train a recognition model having a standard for determination of specific situations. The learning part 1110 may generate a recognition model having a standard for determination by using collected learning data. As an example, the learning part 1110 may generate, train or update an object recognition model having a standard for determining what objects are included in an image, by using an image including objects as learning data. As another example, the learning part 1110 may generate, train or update an ambient information recognition model having a standard for determining various types of additional information around objects included in an image, by using ambient information included in an image including objects as learning data.

The recognition part 1120 may estimate a subject to be recognized included in specific data, by using specific data as input data for a trained recognition model. As an example, the recognition part 1120 may acquire (or estimate, or infer) object information for objects included in an object area by using an object area (or an image) including objects as input data for a trained recognition model. As another example, the recognition part 1120 may estimate (or determine, or infer) a search category that will provide a search result by applying at least one of object information or context information to a trained recognition model. Here, a plurality of search results may be acquired according to priorities.

At least a part of the learning part 1110 or at least a part of the recognition part 1120 may be implemented as a software module or manufactured in the form of at least one hardware chip, and mounted on the image processing apparatus 100. For example, at least one of the learning part 1110 or the recognition part 1120 may be manufactured in the form of a dedicated hardware chip for artificial intelligence (AI), or as a part of a conventional generic-purpose processor (e.g., a CPU or an application processor) or a graphic dedicated processor (e.g., a GPU), and mounted on the aforementioned various types of electronic apparatuses or object recognition apparatuses. Here, a dedicated hardware chip for AI is a dedicated processor specialized in probability operations, and the chip can process operating works in the field of AI such as machine learning swiftly as it has a more excellent performance in parallel processing than conventional generic-purpose processors. In a case where the learning part 1110 or the recognition part 1120 are implemented as a software module (or, a program module including instructions), the software module may be stored in a non-transitory computer readable medium. In this case, the software module may be provided by an operating system (OS), or by a specific application. Alternatively, a part of the software module may be provided by an OS, and the remaining part may be provided by a specific application.

Figure 12:
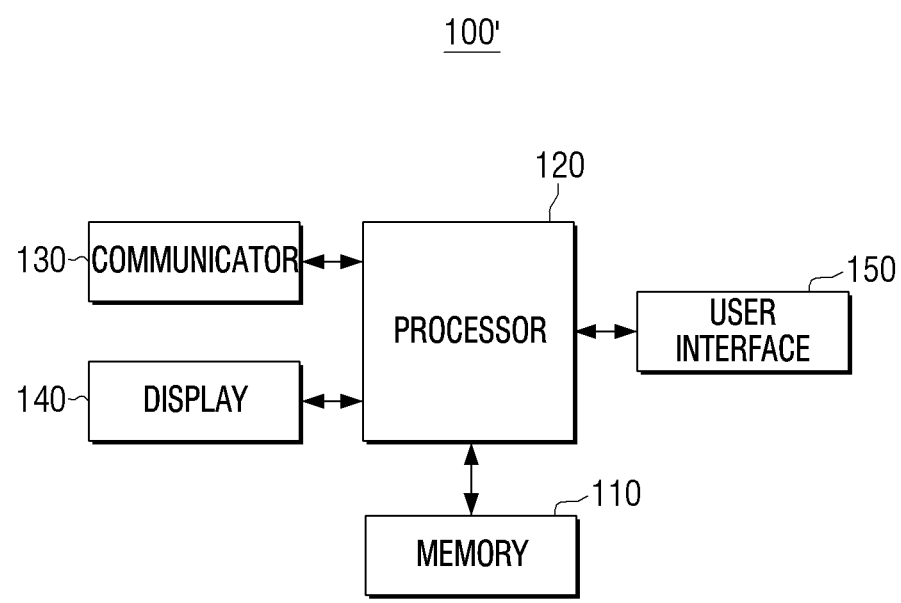
FIG. 12 is a flow chart for illustrating an image processing method according to an embodiment.

FIG. 12 is a diagram which illustrates an example of implementation of an image processing apparatus according to another embodiment.

According to FIG. 12, an image processing apparatus 100' includes memory 110, a processor 120, a communicator 130, a display 140 and a user interface 150. Among the components illustrated in FIG. 12, with respect to components that overlap with the components illustrated in FIG. 2, detailed explanation will be omitted.

The communicator 130 receives various types of contents. For example, the communicator 130 may receive input of an image signal from an external apparatus (e.g., a source apparatus), an external storage medium (e.g., a USB), an external server (e.g., a webhard), etc. by a streaming or downloading method through communication methods such as Wi-Fi based on an AP (a wireless LAN network), Bluetooth, Zigbee, a wired/wireless local area network (LAN), WAN, ethernet, IEEE 1394, a high definition multimedia interface (HDMI), a mobile high-definition link (MHL), a universal serial bus (USB), a display port (DP), a thunderbolt, a video graphics array (VGA) port, an RGB port, a D-subminiature (D-SUB), a digital visual interface (DVI), etc.

The display 140 may be implemented as various forms of displays such as a liquid crystal display (LCD), an organic light emitting diode (OLED) display, light emitting diodes (LEDs), a plasma display panel (PDP), etc. In the display 140, a driving circuit that may be implemented in a form such as an a-si TFT, a low temperature poly silicon (LTPS) TFT, an organic TFT (OTFT), etc., a backlight unit, and the like may also be included. The display 140 may be implemented as a touch screen combined with a touch sensor, a flexible display, a 3D display, etc.

Also, the display 140 according to an embodiment may include not only a display panel that outputs images, but also a bezel that houses the display panel. In particular, a bezel according to an embodiment may include a touch sensor for detecting a user interaction.

The processor 120 may control the display 140 to display images processed according to various embodiments.

According to an embodiment, the processor 120 may perform a graphic processing function (a video processing function). For example, the processor 120 may generate a screen including various objects such as icons, images, texts, etc. by using an operation part and a rendering part. Here, the operation part may operate attribute values such as coordinate values, forms, sizes, colors, etc. by which each object will be displayed according to the layout of the screen, based on the received control instruction. The rendering part may generate screens in various layouts including objects, based on the attribute values operated at the operation part. Further, the processor 120 may perform various types of image processing such as decoding by video data, scaling, noise filtering, frame rate conversion, resolution conversion, etc.

According to another embodiment, the processor 120 may perform processing of audio data. To be specific, the processor 120 may perform various types of processing such as decoding or amplification, noise filtering, etc. of audio data.

A user interface 150 may be implemented as an apparatus such as a button, a touch pad, a mouse and a keyboard, or as a touch screen that is capable of performing both the aforementioned display function and an operation input function. Here, the button may be various types of buttons, such as a mechanical button, a touch pad, a wheel, etc. formed in any area like the front surface portion, the side surface portion, the rear surface portion, etc. of the exterior of the main body of the image processing apparatus 100.

The image processing apparatus 100 may additionally include a tuner and a demodulation part depending on embodiments.

The tuner may receive radio frequency (RF) broadcast signals by tuning a channel selected by a user or all pre-stored channels among RF broadcast signals received through an antenna.

The demodulation part may receive a converted digital IF (DIF) signal from the tuner and demodulate the signal, and perform channel decoding, etc.

Figure 13:
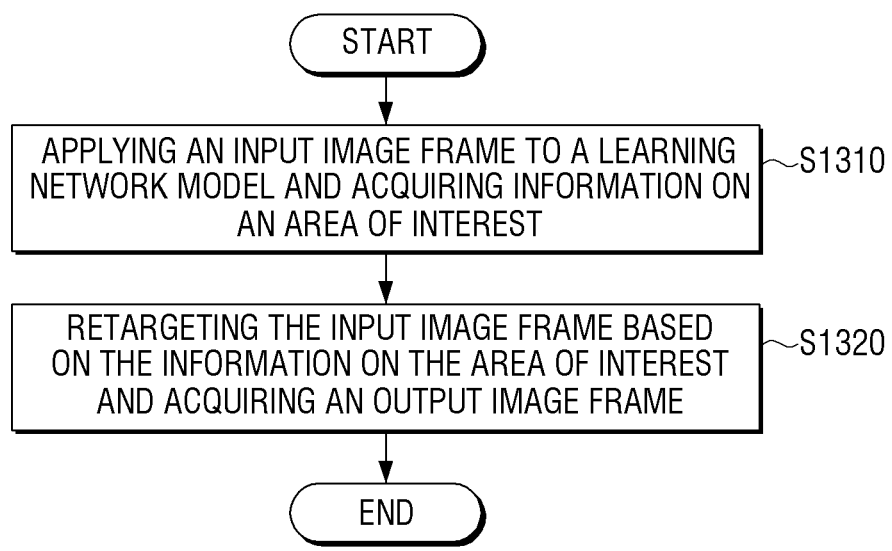
FIG. 13 is a flow chart for illustrating an image processing method according to an embodiment.

FIG. 13 is a flow chart for illustrating an image processing method according to an embodiment.

According to the image processing method illustrated in FIG. 13, information on an area of interest may be acquired by applying an input image frame to a learning network model in step S1310. Here, the learning network model may be a model that is trained to acquire information on the area of interest in the input image frame.

Then, an output image frame may be acquired by retargeting the input image frame based on information on the area of interest in step S1320.

Here, information on the area of interest may include at least one of size information, location information or type information of the area of interest.

Also, information on the area of interest may be one dimensional information including location information corresponding to a parallel direction and size information of the input image frame. In this case, in step S1320 wherein an output image frame is acquired, at least one piece of one dimensional information among a plurality of pieces of one dimensional information may be identified based on at least one of the size of the one dimensional information or the types of objects corresponding to the one dimensional information, and the input image frame may be retargeted based on the identified one dimensional information.

In step S1320 wherein an output image frame is acquired, the input image frame may be retargeted by applying a first conversion weight to pixels corresponding to the area of interest, and applying a second conversion weight to pixels corresponding to the remaining area. Here, the second conversion weight may be acquired based on resolution information on the input image frame and resolution information on the output image frame.

Also, in step S1320 wherein an output image frame is acquired, the size of the pixels corresponding to the area of interest may be maintained by applying the first conversion weight to the pixels, and the pixels corresponding to the remaining area may be upscaled by applying the second conversion weight to the pixels.

In step S1310 wherein information on an area of interest is acquired, information on the area of interest acquired from each of a first input image frame and at least one second input image frame that was input prior to the first input image frame may be accumulated, and information on the area of interest corresponding to the first input image frame may be acquired based on the accumulated information.

Also, in step S1310 wherein information on an area of interest is acquired, average size information and average location information of the area of interest may be acquired based on the size information and the location information of the area of interest acquired from each of the first input image frame and the second input image frame. In this case, in step S1320 wherein an output image frame is acquired, an output image frame corresponding to the first input image frame may be acquired based on the average size information and the average location information of the area of interest.

A learning network model may include a feature detector that detects information related to objects included in the input image frame and a feature map extractor that acquires size information, location information and type information of the area of interest.

Also, the learning network model may learn the weight of a neural network included in the learning network model by using information on the area of interest and a plurality of images corresponding to the information on the area of interest.

According to the various embodiments, an output image can be acquired while the aspect ratio of the input image is adjusted without distortion of the main areas of the image.

According to the aforementioned various embodiments, distortion of an image content can be minimized while maintaining temporal coherency, which cannot be achieved by a conventional cropping-based method (a technic of cutting out only some areas of an image based on a parallel or vertical axis of the image regardless of the features of the image), a seam carving-based method (a technic of finding connected lines (seams) in an image that are not important, and adjusting the aspect ratio by enlarging or reducing the areas where the lines found exist) or a warping-based method (a technic of determining the degree of importance per pixel in an image, and adjusting the aspect ratio as desired by enlarging or reducing the image partially according to the degree of importance).

The various embodiments can be applied not only to image processing apparatuses described herein, but also to all kinds of image processing apparatuses which are capable of image processing, such as an image receiving apparatus like a set-top box, a display apparatus like a TV, etc.

Also, methods according to the aforementioned various embodiments may be implemented in the form of an application that can be installed on a conventional image processing apparatus. In addition, methods according to the aforementioned various embodiments may be implemented only with software upgrade or hardware upgrade of a conventional image processing apparatus. Further, the aforementioned various embodiments may also be performed through an external server of at least one of an embedded server provided on an image processing apparatus, an image processing apparatus or a display apparatus.

According to an embodiment, the various embodiments described so far may be implemented as software including instructions stored in machine-readable storage media that can be read by machines (e.g. computers). Machines refer to apparatuses that are capable of calling instructions stored in storage media, and can operate according to the called instructions, and the apparatuses may include an image processing apparatus according to the aforementioned embodiments (e.g. an image processing apparatus 100). In a case where an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment, the methods according to the various embodiments described above may be provided while being included in a computer program product. A computer program product refers to a product, and it can be traded between a seller and a buyer. A computer program product can be distributed on-line in the form of a storage medium that is readable by machines (e.g. compact disc read only memory (CD-ROM)), or through an application store (e.g. play Store™). In the case of on-line distribution, at least a portion of a computer program product may be stored in a storage medium such as the server of the manufacturer, the server of the application store, and the memory of the relay server at least temporarily, or may be generated temporarily.

Further, each of the components according to the aforementioned various embodiments (e.g. a module or a program) may include a singular object or a plurality of objects. Also, among the aforementioned corresponding sub components, some sub components may be omitted, or other sub components may be further included in the various embodiments. Generally or additionally, some components (e.g. a module or a program) may be integrated as an object, and perform the functions that were performed by each of the components before integration identically or in a similar manner. A module, a program, or operations performed by other components according to the various embodiments may be executed sequentially, in parallel, repetitively, or heuristically. Or, at least some of the operations may be executed or omitted in a different order, or other operations may be added.

While the disclosure has been shown and described with reference to embodiments thereof, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An image processing apparatus, comprising:
a memory storing at least one instruction;
a processor configured to execute the at least one instruction to:
apply a learning network model to an input image frame and acquire information on an area of interest; and
acquire an output image frame by retargeting the input image frame based on the acquired information on the area of interest; and
a display configured to display the acquired output image frame,
wherein the learning network model is trained to acquire the information on the area of interest in the input image frame, and
wherein the processor is further configured to:
accumulate information on the area of interest acquired from each of a first input image frame and at least one second input image frame that was input prior to the first input image frame; and
acquire information on the area of interest corresponding to the first input image frame based on the accumulated information,
wherein the information on the area of interest is one dimensional information, the one dimensional information comprising location information, in a parallel direction or in a vertical direction, of the area of interest and size information of the area of interest.

2. The image processing apparatus of claim 1, wherein the information on the area of interest further comprises type information of the area of interest.

3. The image processing apparatus of claim 1, wherein the processor is further configured to:
identify at least one piece of one dimensional information among a plurality of pieces of one dimensional information based on at least one of a size of the one dimensional information or types of objects corresponding to the one dimensional information, and
retarget the input image frame based on the identified one dimensional information.

4. The image processing apparatus of claim 1, wherein the processor is further configured to retarget the input image frame by applying a first conversion weight to pixels corresponding to the area of interest of the input image frame, and by applying a second conversion weight to pixels corresponding to a remaining area of the input image frame other than the area of interest, and wherein the second conversion weight is acquired based on resolution information on the input image frame and resolution information on the output image frame.

5. The image processing apparatus of claim 4, wherein the processor is further configured to:

maintain a size of the pixels corresponding to the area of interest by applying the first conversion weight to the pixels, and upscale the pixels corresponding to the remaining area by applying the second conversion weight to the pixels.

6. The image processing apparatus of claim 1, wherein the processor is further configured to:

acquire average size information and average location information of the area of interest based on the size information and the location information of the area of interest acquired from each of the first input image frame and the at least one second input image frame, and acquire an output image frame corresponding to the first input image frame based on the average size information and the average location information of the area of interest.

7. The image processing apparatus of claim 1, wherein the learning network model comprises a feature detector configured to detect information related to objects included in the input image frame, and a feature map extractor configured to acquire the size information, the location information and type information of the area of interest.

8. The image processing apparatus of claim 1, wherein the learning network model is configured to learn a weight of a neural network included in the learning network model by using the information on the area of interest and a plurality of images corresponding to the information on the area of interest.

9. An image processing method by an image processing apparatus, the image processing method comprising:

applying learning network model to an input image frame and acquiring information on an area of interest;

acquiring an output image frame by retargeting the input image frame based on the information on the area of interest; and displaying, on a display of the image processing apparatus, the acquired output image frame, wherein the learning network model is a model that is trained to acquire the information on the area of interest in the input image frame, and wherein the acquiring the information on the area of interest comprises:

accumulating information on the area of interest acquired from each of a first input image frame and at least one second input image frame that was input prior to the first input image frame; and acquiring information on the area of interest corresponding to the first input image frame based on the accumulated information, wherein the information on the area of interest is one dimensional information, the one dimensional information comprising location information, in a parallel direction or in a vertical direction, of the area of interest and size information of the area of interest.

10. The image processing method of claim 9, wherein the information on the area of interest further comprises type information of the area of interest.

11. The image processing method of claim 9, wherein the acquiring the output image frame comprises:

identifying at least one piece of one dimensional information among a plurality of pieces of one dimensional information based on at least one of a size of the one dimensional information or types of objects corresponding to the one dimensional information, and retargeting the input image frame based on the identified one dimensional information.

12. The image processing method of claim 9, wherein the acquiring the output image frame comprises:

retargeting the input image frame by applying a first conversion weight to pixels corresponding to the area of interest of the input image frame, and applying a second conversion weight to pixels corresponding to a remaining area of the input image frame other than the area of interest, and the second conversion weight is acquired based on resolution information on the input image frame and resolution information on the output image frame.

13. The image processing method of claim 12, wherein the acquiring the output image frame comprises:

maintaining a size of the pixels corresponding to the area of interest by applying the first conversion weight to the pixels, and upscaling the pixels corresponding to the remaining area by applying the second conversion weight to the pixels.

14. The image processing method of claim 9, wherein the acquiring the information on the area of interest comprises acquiring average size information and average location information of the area of interest based on the size information and the location information of the area of interest acquired from each of the first input image frame and the at least one second input image frame, and wherein the acquiring the output image frame comprises acquiring the output image frame corresponding to the first input image frame based on the average size information and the average location information of the area of interest.

15. A non-transitory computer readable medium storing a computer instruction which is executable by a processor of an image processing apparatus to perform:

applying a learning network model to an input image frame and acquiring information on an area of interest;

retargeting the input image frame based on the information on the area of interest and acquiring an output image frame; and displaying, on a display of the image processing apparatus, the acquired output image frame, wherein the learning network model is a model that is trained to acquire the information on the area of interest in the input image frame, and wherein the acquiring the information on the area of interest comprises:

accumulating information on the area of interest acquired from each of a first input image frame and at least one second input image frame that was input prior to the first input image frame; and acquiring information on the area of interest corresponding to the first input image frame based on the accumulated information, wherein the information on the area of interest is one dimensional information, the one dimensional information comprising location information, in a parallel direction or in a vertical direction, of the area of interest and size information of the area of interest.

* * * * *